No. 732,879. PATENTED JULY 7, 1903.
E. MORTERUD.
VALVE AND MEANS FOR ACTUATING SAME.
APPLICATION FILED MAR. 6, 1903.
NO MODEL.
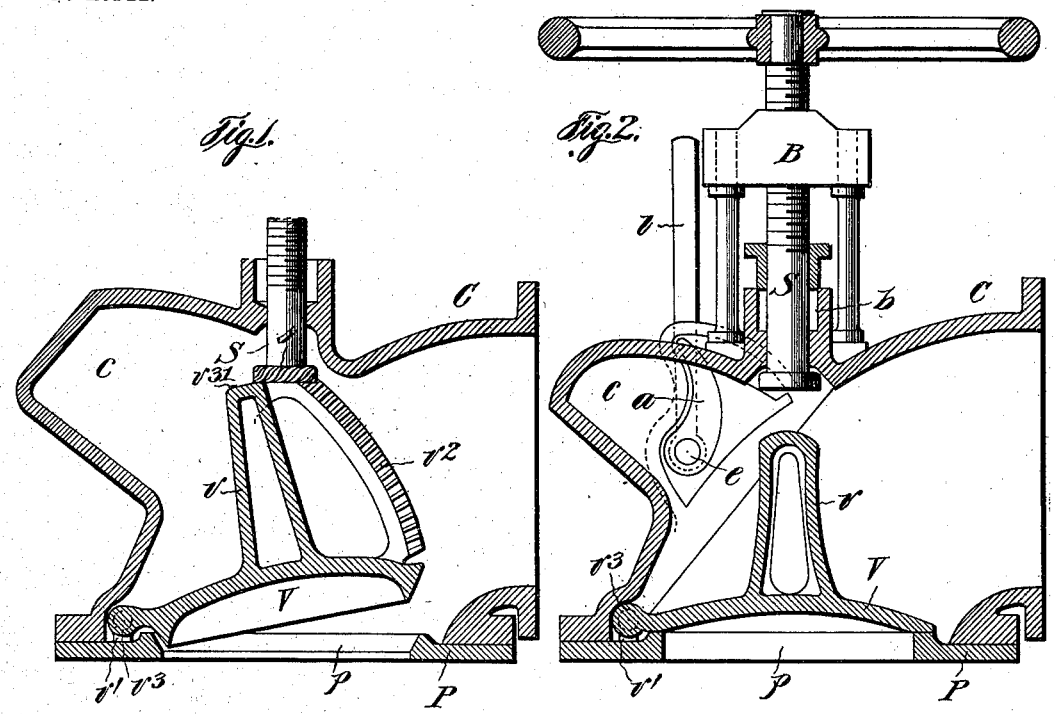
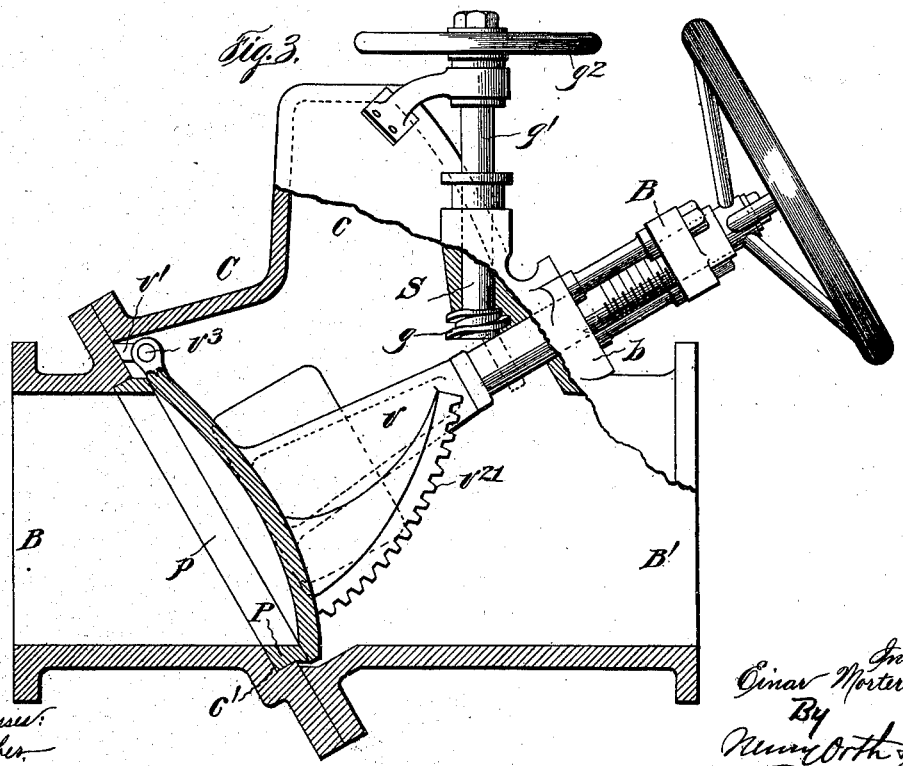

No. 732,879. Patented July 7, 1903.

UNITED STATES PATENT OFFICE.

EINAR MORTERUD, OF KONGA, SWEDEN.

VALVE AND MEANS FOR ACTUATING SAME.

SPECIFICATION forming part of Letters Patent No. 732,879, dated July 7, 1903.

Original application filed January 10, 1901, Serial No. 42,804. Divided and this application filed March 6, 1903. Serial No. 146,575. (No model.)

*To all whom it may concern:*

Be it known that I, EINAR MORTERUD, a subject of the King of Sweden and Norway, residing at Konga, in the Kingdom of Sweden, have invented certain new and useful Improvements in Valves and Means for Actuating the Same; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to valves of the type described in my application for patent, Serial No. 42,804, filed January 10, 1901, of which this application is a division.

As described in the aforementioned application, it is essential to a reliable closure of a valve when subjected to high pressures that the pressure of the closing or seating device be exerted on the valve in a direction perpendicular to its plane and coaxial therewith, or substantially so. In my said application I have also described various means whereby the travel of the valve-actuating spindle can be reduced to a much greater extent than is possible in high-pressure cut-off valves as hitherto constructed, and I have also described arrangements whereby a valve-seat having a valve-port of the same cross-sectional area as that of the internal area of the casing can be employed, together with structural features, whereby the valve edge when the valve is fully open will be in line or flush with the edge of the port controlled thereby and with the inner wall of the casing, or substantially so.

The essential feature of this part of my invention lies in the provision of means whereby the distance traveled by the spindle to fully open or close the valve can be still further reduced, which object I attain, as will now be fully described, reference being had to the accompanying drawings, in which—

Figures 1, 2, and 3 are vertical sections of valves, illustrating various means whereby the object of this part of my invention is attained.

In order that the extent of travel of the valve-spindle may be reduced to a minimum and a reliable closure of the valve-controlled port obtained, I provide the valve on its back with a projection coaxial therewith and with the valve-spindle and valve-controlled port, said projection being of such a length or height that the spindle will have to move but a very short distance to fully open and close the valve and hold it firmly to its seat. The valve here also has a pivotal connection between its edge and the casing, and the valve-actuating spindle is also arranged perpendicular to the plane of the valve-seat and coaxial therewith.

In Figs. 1 and 2 I have shown the valve-casing C constructed for interposition in pipes at right angles to each other, and V indicates the valve, $v^3$ one of its journals, (shown in dotted lines,) $v'$ one of the journal-bearings, $c$ the recess in valve-casing C of such a depth and configuration as to snugly accommodate the valve and its projection, so that when the valve is fully open its edge will be in line or flush with the inner wall of its casing, or substantially so, and P is the valve-seat plate provided with the valve-controlled port $p$.

On the back of the valve is formed a preferably hollow, conical, or upwardly-tapering axial projection $v$, which has formed thereon a segmental toothed rack $v^2$, adapted to gear with a correspondingly-toothed head $s$ on the inner end of the valve-spindle S, which, as usual, works in a screw-threaded bearing B, as shown, for instance, in Figs. 2 and 3, said spindle passing through a suitable stuffing-box $b$.

When the valve is fully closed, the head $s$ has bearing on the upper face of the projection $v$ and is thus securely held to its seat. When, on the other hand, the spindle S is retracted to allow the valve to rotate on its pivotal connection a sufficient distance, rack $v^2$ will be moved into gear with the toothed periphery of the head $s$, and the spindle can then be made to rotate the valve on its pivotal connection to any desired extent or until the valve has been moved into the recess and is then fully open. On the other hand, in closing the valve it is moved nearly to its seat through the medium of the described gearing, after which the head $s$ will impinge upon the upper face $v^{31}$ of the projection $v$ to fully close the valve by a further inward movement of the spindle S, as will be readily understood. The same results may be obtained by providing means independently of the spindle S for moving the valve after the spindle has moved out of or before it moves into engagement with said valve. For instance, as shown in Fig. 2, a crank-arm $a$, secured to a spindle $e$, may be so arranged as to impinge upon the back of the valve V after the spindle S has been retracted a sufficient distance, said spindle $e$ having secured thereto a hand-lever $l$ for rotating the spindle and crank or cam $a$.

It will be seen that when the valve V and spindle S are in the relative positions shown in Fig. 2 the valve will open fully under the pressure thereon; but if the crank-arm $a$ is moved into contact with the back of the valve V before the spindle S is retracted the extent of opening of the valve can be controlled by the hand-lever after the spindle S has been moved out of the path of the projection, as will readily be understood.

In Fig. 3 I have shown the valve-casing as constructed for interposition in alined piping, the valve V being here also provided with a segmental toothed rack $v^{21}$, which is, however, not engaged by the spindle-head $s$, but by a suitable worm-gear $g$ on a separate spindle $g'$, provided with a hand-wheel $g^2$, so positioned that when the spindle is moved out of the path of the projection $v$ and the valve V opens under the pressure thereon the rack $v^{21}$ will be moved into gear with the worm $g$ and may then be rotated to any desired extent on its pivotal connection $v'$ or until the valve is fully open. In said Fig. 3 the valve-casing C is shown as provided with an internal recess $c'$ for the reception of the valve-seat plate P, whose port $p$ may in this case be of the same cross-sectional area as the like internal area of the inlet and outlet branches B B', respectively, of the casing.

It will be obvious to any skilled machinist that the extent to which the valve-spindle S has to travel to admit of fully opening the valve is very small, about from fifteen per cent. to twenty per cent. of the valve or the port controlled thereby.

Having thus described my invention, what I claim as new therein, and desire to secure by Letters Patent, is—

1. In combination, a valve-casing, a valve-seat therein encompassing a port, a spindle perpendicular to the plane of said seat and coaxial with said port, a valve, a pivotal connection between the valve edge and casing, said spindle adapted to hold the valve to its seat and said valve adapted to be unseated by the pressure thereon, and means controlling the further movement of the valve from, and its movement nearly to its seat, for the purpose set forth.

2. In combination, a valve-casing, a valve-seat therein encompassing a port, a valve-spindle perpendicular to the plane of the seat and coaxial with said port, a valve controlling said port, a pivotal connection between the valve edge and casing, a projection from the back of the valve in line with the spindle, the latter acting on said projection to hold the valve to its seat, and said valve adapted to be unseated by pressure thereon when released by the spindle, and means controlling the further movement of the valve from, and its movement nearly to its seat, for the purpose set forth.

3. In combination, a valve-casing, a valve-seat therein encompassing a port, a valve-spindle perpendicular to the plane of the seat and coaxial with said port, a valve controlling said port, a pivotal connection between the valve edge and casing, a projection from the back of the valve in line with the spindle, the latter acting on said projection to hold the valve to its seat, and said valve adapted to be unseated by pressure thereon when released by the spindle, and means independent of the spindle controlling the further movement of the valve from, and its movement nearly to its seat, for the purpose set forth.

4. In combination, a valve-casing, a valve-seat therein encompassing a port, a valve-spindle perpendicular to the plane of the seat, coaxial therewith and having an inner enlarged head, a valve controlling the aforesaid port, a pivotal connection between the valve edge and casing, a projection from the back of the valve in line with the spindle, a sectoral-toothed rack on the back of the valve, and a hand-operated gear in the path of said rack adapted to engage the same after the valve is released by the spindle and unseated by the pressure thereon, for the purpose set forth.

In testimony that I claim the foregoing as my invention I have signed my name in presence of two subscribing witnesses.

EINAR MORTERUD.

Witnesses:
HENRY BORDEWICH,
ALFRED J. BRYN.